US005435862A

United States Patent [19]

Williams et al.

[11] Patent Number: 5,435,862

[45] Date of Patent: Jul. 25, 1995

[54] LABEL APPLICATOR

[75] Inventors: Phillip M. Williams; Richard D. Franklin, both of Germantown, Tenn.

[73] Assignee: PTI, Inc., Memphis, Tenn.

[21] Appl. No.: 161,686

[22] Filed: Dec. 2, 1993

Related U.S. Application Data

[63] Continuation of Ser. No. 772,485, Oct. 7, 1991, abandoned.

[51] Int. Cl.[6] .............................................. B32B 31/00

[52] U.S. Cl. ...................................... 156/64; 156/277; 156/350; 156/384; 156/541; 156/542; 156/556; 271/31; 271/94

[58] Field of Search ............... 156/277, 361, 384, 540, 156/541, 542, 556, 64, 350; 271/31, 91, 94

[56] References Cited

U.S. PATENT DOCUMENTS

| | | | |
|---|---|---|---|
| 3,450,590 | 6/1969 | La Mers | 156/361 |
| 3,729,362 | 4/1973 | French et al. | 156/542 |
| 3,769,139 | 10/1973 | Woods | 156/358 |
| 4,025,382 | 5/1977 | Del Rosso | 156/497 |
| 4,046,613 | 9/1977 | Kucheck et al. | 156/361 |
| 4,089,725 | 5/1978 | Crankshaw et al. | 156/299 |
| 4,124,429 | 11/1978 | Crankshaw | 156/542 |
| 4,132,583 | 1/1979 | Hodgson | 156/361 |
| 4,210,484 | 7/1980 | Crankshaw et al. | 156/542 |
| 4,255,220 | 3/1981 | Kucheck et al. | 156/285 |
| 4,303,461 | 1/1981 | La Mers | 156/361 |
| 4,367,118 | 1/1983 | Karp | 156/497 |
| 4,435,246 | 3/1984 | Green | 156/542 |
| 4,468,274 | 8/1984 | Adachi | 156/320 |
| 4,561,921 | 12/1985 | Treiber | 156/297 |
| 4,595,447 | 6/1986 | Lindstrom | 156/364 |
| 4,726,865 | 2/1988 | Treat | 156/361 |
| 4,787,953 | 11/1988 | Trouteaud et al. | 156/387 |
| 4,844,771 | 7/1989 | Crankshaw et al. | 156/387 |
| 4,895,614 | 1/1990 | Trouteaud et al. | 156/542 |

*Primary Examiner*—David A. Simmons
*Assistant Examiner*—Paul M. Rivard

[57] ABSTRACT

A label applicator for applying a label to an article. The label includes a first side having printed matter visible thereon and including a second side having a pressure sensitive adhesive thereon. The label applicator includes label support structure for supporting the label with the second side of the label resting on the label support structure; and label transfer structure for griping the first side of the label, for picking-up the label from the label support structure, and for pressing the label onto the article.

29 Claims, 3 Drawing Sheets

LABEL APPLICATOR

This is a continuation of application Ser. No. 07/772,485, filed on Oct. 7, 1991, now abandoned.

BACKGROUND OF THE INVENTION

1. Field of the Invention

The present invention relates, in general, to apparatus for printing pressure sensitive labels and attaching the printed labels to articles.

2. Description of the Related Art

A preliminary patentability search conducted in class 156, subclasses 540, 542, 568 and 570 discloses the following patents which may be relevant to the present invention:

French et al., U.S. Pat. No. 3,729,362, issued Apr. 24, 1973, discloses a labeling machine including a supply reel and a take up reel. Labels are adhesively secured to a backing strip and the backing strip is wound on the supply reel. The backing strip and labels are moved from the supply reel toward the take up reel and the labels are peeled off of the backing strip and momentarily retained at a first station. An applicator transfers the label to an adjacent article.

Woods, U.S. Pat. No. 3,769,139, issued Oct. 30, 1973, discloses a labeler in which labels, coated with pressure sensitive adhesive and carried by a web of release paper having formed therein feed sprocket holes, are drawn along a predetermined path through a print station and about a sharp reverse bend by a feed drum having disposed about the periphery thereof drive pins spaced to correspond to the spacing of the feed sprocket holes in the web of release paper. The feed drum is in turn driven by a solenoid actuated ratchet feed and may be readily replaced by other feed drums having drive pins spaced to correspond with the feed holes on webs of other sizes of labels. As the release paper is drawn about the sharp reverse bend, the label projects outwardly and a hammer, solenoid actuated in timed relationship with the label feed, is driven against the label to slap the label against an article.

Del Rosso, U.S. Pat. No. 4,025,382, issued May 24, 1977, discloses an apparatus for applying a label to an article while the article is being transported along a path of travel by a conveyor. The apparatus includes a vertically movable applicator foot operable to pick up a label from a source and apply such label to the surface of an article, and a vertically movable compressor foot operable to engage the applied label to cause it to conform to the contour of the article surface. The applicator foot and compressor foot are independently supported for conjunctive movements with the article in the direction of conveyor travel, while operably engaged therewith.

Crankshaw et al., U.S. Pat. No. 4,089,725, issued May 16, 1978, discloses an apparatus for transferring labels to articles which are moved in a first direction through a station. The apparatus includes means for releasably retaining first and second labels at first and second positions with the positions defining a row at the station, the axis of the row extending generally in the first direction and the first position being downstream, in the direction of article movement, of the second position; means for transferring the first and second labels from the retaining means to first and second articles, respectively, as the first and second articles are moved through the station; and control means for controlling the transferring means so that the transferring means initiates transfer of the first label to the first article before initiating transfer of the second label to the second article.

Crankshaw et al., U.S. Pat. No. 4,210,484, issued Jul. 1, 1980, discloses a label applicator adapted for use with labels which are provided in a plurality of rows extending longitudinally on a backing strip. The label applicator includes a label dispenser for peeling the labels from the backing strip with the labels moving in a first direction off of the backing strip to provide at least first and second labels at a label dispensing station. A label separator receives the first and second labels and separates them in a direction generally transverse to the first direction to increase the distance between the first and second labels. The separated labels are then transferred to at least one article.

Kucheck et al., U.S. Pat. No. 4,255,220, issued Mar. 10, 1981, discloses a label applicator including a label receiver mounted on supporting structure for movement between a retracted position and an extended position. A label dispenser supplies a label to the label receiver when the label receiver is in the retracted position. The label is releasably retained on the label receiver. The label receiver is then moved to the extended position where the label is transferred by an air blast from the label receiver to an article.

Karp, U.S. Pat. No. 4,367,118, issued Jan. 4, 1983, discloses a label applicator for seizing a printed, adhesive backed label and for applying the label to a commodity. The applicator includes a pick-up head for vacuum-seizing a portion of the label by its non-adhesive side and for swinging the label to a label transfer station. At the latter station, the pick-up head releases its grip on the label and an applicator head vacuum-seizes another portion of the non-adhesive side of the label and then applies the label to the commodity.

Treiber, U.S. Pat. No. 4,561,921, issued Dec. 31, 1985, discloses a label applicator device that receives a label from a label printer and applies the label to a package by means of a pressure-sensitive adhesive which coats one side of the label. The applicator device includes a label support means which receives a label with the adhesive coated side facing upward. The label support means includes a pair of fingers upon which the label rests. A label transfer nozzle is pivoted about a horizontal axis beneath the label support means into a first position in which it is received between the pair of fingers and engages the printed side of the label by means of a partial vacuum supplied through a vacuum port in the transfer nozzle. The transfer nozzle is then pivoted into a second position in which the adhesive coated side of the label is facing generally downward. The applicator device includes an applicator head which moves downward, removing the label from the transfer nozzle and pressing it into contact with the surface of a package.

Lindstrom, U.S. Pat. No. 4,595,447, issued Jun. 17, 1986, discloses an article labeling machine including a bell-shaped vacuum foot that subtends from a vertically extending tube to receive a printed label in a first orientation from the label dispenser which is located to one side of and at a higher elevation than a conveyor which is transporting articles to be labeled. The label carrying vacuum foot is moved laterally away from the dispenser through a downwardly smoothly curving diagonal path devoid of any abrupt directional changes. If required, the tube is simultaneously operated to rotate the label into a preselected second orientation as it is being lowered upon the article to be labeled.

Trouteaud et al., U.S. Pat. No. 4,787,953, issued Nov. 29, 1988, and Trouteaud et al., U.S. Pat. No. 4,895,614, issued Jan. 23, 1990, disclose label transfer apparatuses including a label transfer arm having a central axis and comprising a socket body with a transfer nozzle rotatably mounted therein for engaging labels delivered to a label pickup station and for transferring them to a label delivery station. An applicator head strips the labels from the transfer arm and moves them along a fixed path from the label delivery station to a package labeling station to apply the labels to packages. Transfer arm guiding rails are positioned on either side of the label transfer arm for engaging an eccentric collar attached to the transfer nozzle to thereby orient the transfer nozzle into a fixed angular orientation about the central axis of the transfer arm when the transfer arm is at the label delivery station. An operator-controllable selector ring is rotatably mounted to the socket body of the arm and is freely rotatable between selected locations defined by detents. By selecting the angular orientation of the arm at the label pickup station and forcing the arm into a fixed angular orientation at the label delivery station, a label held by the transfer arm is rotated about the central axis of the arm by an angle equal to the difference between the selected angular orientation and the fixed angular orientation.

Crankshaw et al., U.S. Pat. No. 4,844,771, issued Jul. 4, 1989, discloses a label applicator including a support structure in predetermined relationship with a labeling station at which to apply a label to an article. A label dispenser mounted on the support structure dispenses a label to be applied to the article and a receiver movably mounted on the support structure transports the label from the dispenser to the labeling station. Receiver mounting components are provided for mounting the receiver on the support structure both to enable generally linear movement of the receiver along a path between a retracted position adjacent the dispenser and an extended position adjacent the labeling station, and to enable pivotal movement of the receiver about a pivot axis between a label-receiving position in which the label receiver can receive a label from the dispenser and a label-applying position in which the label can be transferred from the label receiver to a face of an article at the labeling station. Label retaining components releasably retain the label on the receiver so that the label can be transported by the receiver to the labeling station for application to the face of the article.

None of the above patents disclose or suggest the present invention. More specifically, none of the above patents disclose or suggest a label applicator for applying a label to an article; the label including a first side having printed matter visible thereon and including a second side having a pressure sensitive adhesive thereon; the label applicator including label support means for supporting the label with the second side of the label resting on the label support means; and label transfer means for picking-up the label from the label support means and pressing the label onto the article.

SUMMARY OF THE INVENTION

The present invention is directed toward providing an improved label applicator for receiving a label from a label printer and for applying the label to an article. The applicator of the present invention is for use with labels including a first side having printed matter visible thereon and including a second side having a pressure sensitive adhesive thereon. The label applicator of the present invention includes, in general, label support means for supporting the label from the label printer with the second side of the label resting on the label support means; and label transfer means for picking-up the label from the label support means and pressing the label onto the article.

One object of the present invention is to provide a label applicator which will grab a pressure-sensitive label from the non-sticky side after the label has been discharged from the output port of a label printer and after any backing has been stripped off the sticky side of the label.

Another object of the present invention is to provide a label applicator which will interface directly with existing equipment (e.g., label printers, transfer mechanism, article conveyors, etc.).

DESCRIPTION OF THE PREFERRED EMBODIMENT

Figures 1, 2:
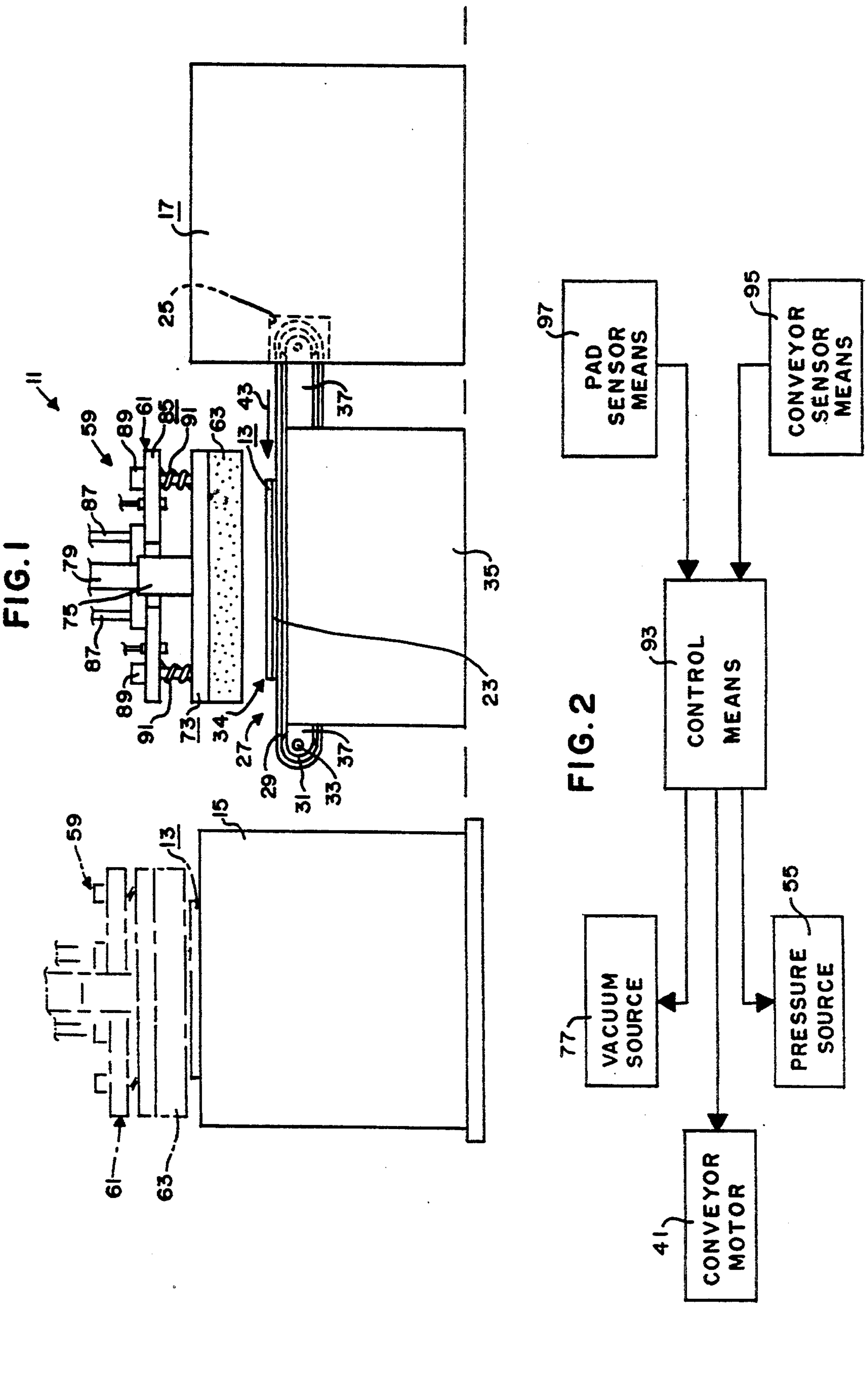
FIG. 1 is a somewhat diagrammatic side elevational view of the label applicator of the present invention.
FIG. 2 is a block diagram of the control means of the label applicator of the present invention.
Figure 3:
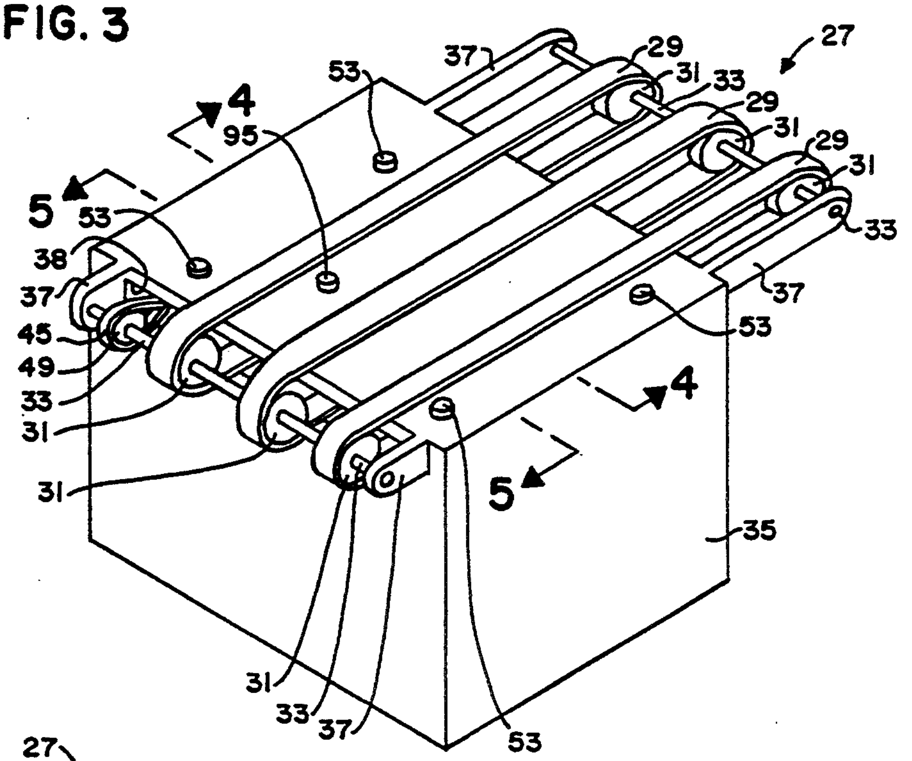
FIG. 3 is a perspective view of the label conveyor means of the label applicator of the present invention.

The preferred embodiment of the label applicator of the present invention is shown diagrammatically in FIG. 1 and identified by the numeral 11. The label applicator 11 is used to apply pressure sensitive labels 13 to articles 15 and is used in combination with a typical pressure sensitive label printer 17. Each label 13 has a first or face side 19 having printed matter visible thereon, and a second or reverse side 21 having a pressure sensitive adhesive 23 thereon (see, in general, FIG. 4). The label printer 17 may be a standard Intermec 86 series printer (e.g., an Intermec 8646 printer) or the like for printing the printed matter on the first side 19 of each label 13. The label printer 17 is preferably a self-stripping model. More specifically, pressure sensitive label printers typically utilize a plurality of blank labels that are mounted on a roll or strip of release material. After a label is printed, a self-stripping printer will strip or remove the printed label from the roll or strip of release material and expel the stripped, printed label through an output port 25 or the like as will now be apparent to those skilled in the art. However, a non-self-stripping label printer could be used in combination with a separate stripping mechanism as will now be apparent to those skilled in the art.

The label applicator 11 includes a label support means 27 for receiving a label 13 from the label printer 17 with the pressure sensitive adhesive 23 of the label 13 resting on the label support means 27. The label support means 27 preferably includes a label support surface means for allowing the label 13 to be temporarily secured thereto by the pressure sensitive adhesive 23 while allowing the label 13 to be easily removed therefrom without damage to the label 13 for subsequent application to the article 15. More specifically, the label support means 27 preferably includes a plurality of spaced apart belts 29 for forming the label support surface means. Each belt 29 is preferably an endless conveyor belt having a flat outer or support surface and trained about rotatable sheaves or pulleys 31 or the like. More specifically, the pulleys 31 are preferably supported by a pair of spaced apart axles 33 in such a manner so as to define a path of travel for the labels 13 from the output port 25 of the label printer 17 to a pick-up point as indicated by the arrow 34 in FIG. 1 and as will hereinafter become apparent. The axles 33 are preferably attached to a body member 35 by ears 37 or the like. The lower bight of the belts 29 may extend through slots 38 in the opposite ends of the body member 39 with the top bight of the belts located just above the top surface of the body member 35. The belts 29 may be adjustable in any manner now apparent to those skilled in the art to allow the tension of the belts 29 to be adjusted. At least the outer surface of the belts 29 is slick to prevent the pressure sensitive adhesive 23 of the labels 13 from forming a strong adherence thereto. More specifically, the belts 29 are preferably constructed from a slick plastic or the like so that the labels 13 can be removed therefrom without damage to the labels 13, etc., as will now be apparent to those skilled in the art.

Figure 4:
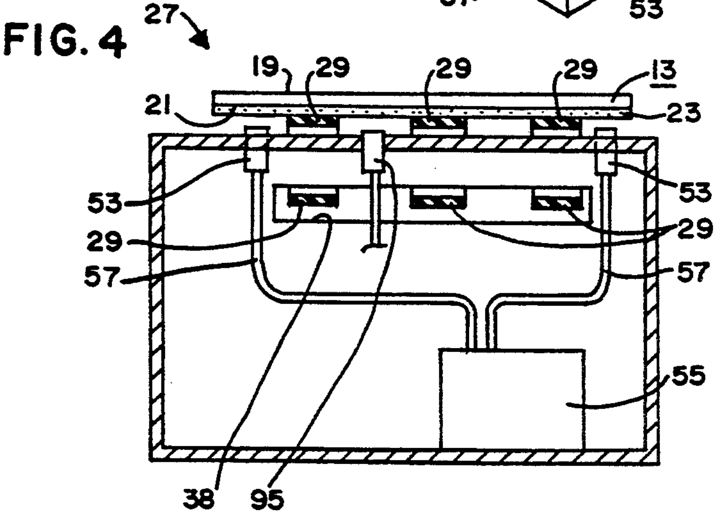
FIG. 4 is a sectional view substantially as taken on line 4—4 of FIG. 3 with certain parts omitted for clarity and with a label shown thereon in broken lines.
Figure 5:
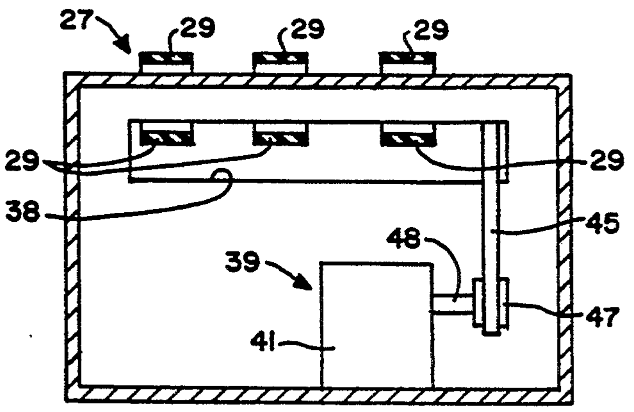
FIG. 5 is a sectional view substantially as taken on line 5—5 of FIG. 3 with portions thereof omitted for clarity.

A drive means 39 is preferably provided for moving the labels 13 from the output port 25 of the label printer 17 to the pick-up point 34. The drive means 39 preferably includes an electric conveyor motor 41 coupled to the belts 29 in such a manner so as to cause the belts 29 to rotate in the direction indicated by the arrow 43 in FIG. 1. More specifically, the motor 41 is preferably coupled to one of the axles 33 by a drive belt 45 through a first pulley 47 attached to the drive shaft 48 of the motor 41 and a second pulley 49 attached to one of the axles 33 so that rotation of the drive shaft 48 of the motor 41 will cause the belts 29 to rotate in the direction indicated by the arrow 43 to thereby cause any label 13 supported on the belts 29 to move from the output port 25 of the label printer 17 to the pick-up point 34. The drive belt 45 may extend through one of the slots 38 in one end of the body member 35 as shown in FIG. 4. The speed at which the drive means 39 rotates the belts 29 is preferably substantially the same speed at which the label printer 17 discharges printed labels 13.

The label applicator 11 preferably includes pressure means 51 for applying pressure to the second side 21 of a label 13 supported on the belts 29 when that label 13 reaches the pick-up point 34 to urge that label 13 from the label support surface means (i.e., from the belts 29). The pressure means 51 preferably includes air control means 53 (e.g., a plurality of air jets or nozzles) for blowing air against the second side 21 of that label 13 adjacent the belts 29 to urge that label 13 upward from the belts 29 as will now be apparent to those skilled in the art. The pressure means 51 preferably includes a pressure source 55 for supplying pressurized air to the air pressure means 53. The pressure source 55 may include an electric air pump or the like coupled to the air pressure means 53 by tubing 57 or the like as will now be apparent to those skilled in the art.

The label applicator 11 includes a label transfer means 59 for picking up a label 13 from the label support means 27 and for applying that label 13 to the article 15.

The label transfer means 59 preferably includes a label grip means 61 for gripping the label 13. The label grip means 61 preferably includes a resilient pad member 63 having a first side 65 for engaging the first side 19 of the label 13, and having a second side 67. A plurality of spaced apart apertures 69 preferably extend from the first side 65 of the pad member 63 to a manifold 71 formed by a plurality of channels which join each of the apertures 69 together to allow a vacuum to be evenly applied to each of the apertures 69 in a manner and for reasons which will hereinafter become apparent. The pad member 63 is preferably constructed of sealed foam for providing a soft touch and for isolating each aperture 69 with vacuum. Thus, by applying a vacuum to the apertures 69 through the manifold 71, the label 13 can be picked-up and gripped by the first side 65 of the pad member 63 when the pad member 63 is placed in contact with the first side 19 of the label 13 as will now be apparent to those skilled in the art. The use of small, multiple apertures 69 keeps the label 13 from deforming when picked up by the pad member 63. The channels of the manifold 71 insure the even flow of vacuum to all apertures 69 and allow the label 13 to be picked up evenly and straight.

The label grip means 61 preferably includes a first mounting plate 73 for being attached to the second side 67 of the pad member 63. The first mounting plate 73 is preferably constructed out of light weight aluminum and has a port 75 for being attached to a vacuum source 77 by a flexible pipe 79 or the like. The vacuum source 77 may include an electric vacuum pump or the like coupled to the port 75 by the pipe 79 or the like as will now be apparent to those skilled in the art. The first mounting plate 73 preferably has a first side 81 and a second side 83. The second side 67 of the pad member 63 is preferably glued or otherwise attached to the second side 83 of the first mounting plate 73 with the manifold 71 communicating with the port 75 so that vacuum can be directed from the vacuum source 77, through the pipe 79 and port 75 to the manifold 71 and apertures 69.

Figure 6:
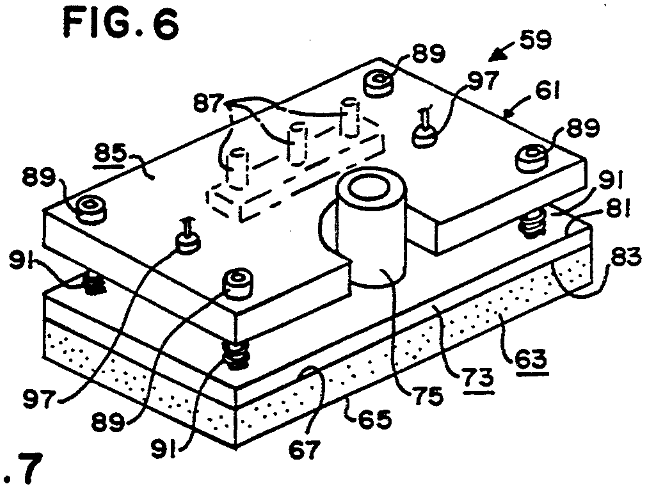
FIG. 6 is a perspective view of a label grip means of the label applicator of the present invention with a portion of a transfer mechanism shown in broken lines.
Figure 7:
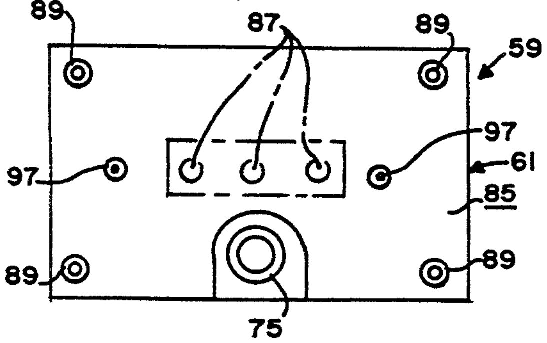
FIG. 7 is a top plan view of the label grip means of FIG. 6.
Figure 9:
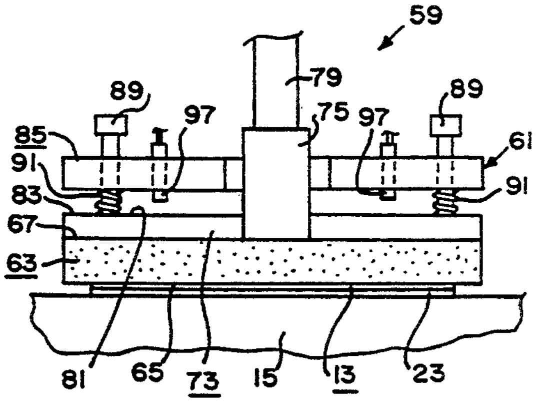
FIG. 9 is a side elevational view of the label grip means of FIG. 6 shown applying a label to an article.
Figure 8:
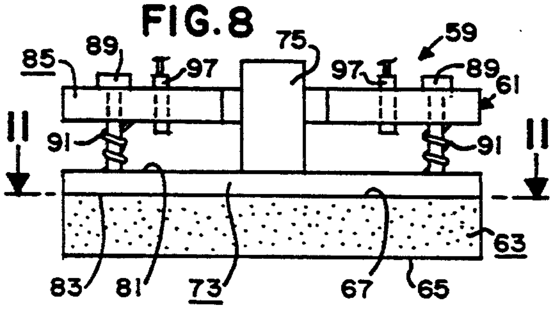
FIG. 8 is a side elevational view of the label grip means of FIG. 6.
Figure 10:
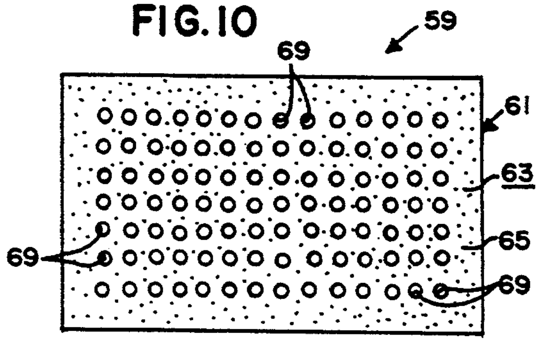
FIG. 10 is a bottom plan view of the label grip means of FIG. 6.
Figure 11:
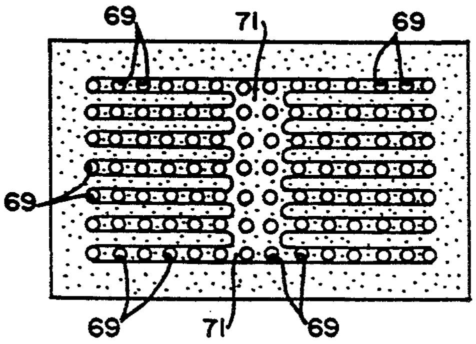
FIG. 11 is a sectional view substantially as taken on line 11—11 of FIG. 8.

The label grip means 61 preferably includes a second mounting plate 85 for being movably attached to the first mounting plate 73 and for being attached to the actuator arms 87 or the like of a transfer mechanism of the label transfer means 59. The second mounting plate 85 is preferably constructed out of light weight aluminum for strength and support. The first and second mounting plates 73, 85 are preferably slidably attached to one another for allowing movement from a first or separated position as shown in solid lines in FIGS. 1, 6 and 8 to a second or compressed position as shown in broken lines in FIG. 1 and in solid lines in FIG. 9 when the pad member 63 is pressed against an article 15. Thus, shoulder bolts 89 preferably slidably extend through apertures between the first and second sides of the second mounting plate 85 adjacent each corner thereof and are fixedly attached to the first mounting plate 73. Spring means, such as typical coil springs 91, are preferably provided about the shaft of each bolt 89 to normally urge the first and second mounting plates 73, 85 to the first or separated position and for controlling the movement of the mounting plates 73, 85 to the second or compressed position as will now be apparent to those skilled in the art.

The transfer mechanism of the label transfer means 59 may be of any specific type now apparent to those skilled in the art. Thus, for example, the transfer mechanism could consist simply of manual means for allowing movement of the label grip means 61 but preferably includes automatic means for moving the label grip means 61 from a first or home position to a second or label-pick-up position for picking-up a label 13 from the pick-up point 34 at the label support means 27, and then to a third or label-application position at the article 15. Thus, the specific construction and operation of such automatic transfer mechanism may vary widely as will now be apparent to those skilled in the art from relatively simple rotation and extension structures based on hydraulic or pneumatic cylinders (see, e.g., Karp, U.S. Pat. No. 4,367,118, issued Jan. 4, 1983 and Treiber, U.S. Pat. No. 4,561,921, issued Dec. 31, 1985) to relative complex robotic arms which allows movement to many different axes, etc., as will now be apparent to those skilled in the art.

The label applicator 11 preferably includes control means 93 for controlling the operation of the pressure source 55 and the vacuum source 77, etc. The control means 93 may include a microprocessor. The label applicator 11 preferably includes a conveyor sensor means 95 for determining when a printed label 13 is at the pick-up point 34 and a pad sensor means 97 for determining when the first and second mounting plates 73, 85 are in the second or compressed position. The conveyor sensor means 95 may include typical photo eye means including an Omron E32-DC200 fiber optic cable and an Omron E3XR-CE4T sensor power supply for producing a signal when a label 13 reaches the pick-up point 34. The signal produced by the conveyor sensor means 95 may be used by the control means 93 to stop the label printer 17 and electric motor 41, to cause the transfer mechanism to move the label grip means 61 to the second or label-pick-up position at the pick-up point 34, to start the vacuum source 77, to start the pressure source 55, and to cause the transfer mechanism to the move the label grip means 61 with the label 13 secured thereto with its sticky side out to third or label-application position in a timed sequence, etc., whereby the label 13 will be grabbed and pick-up by the label grip means 61 and subsequently pressed against the article 15 as will now be apparent to those skilled in the art. Since the conveyor sensor means 95 will continue to produce a signal in the event the label 13 is not picked up by the label grip means 61, the control means 93 can be programmed or designed to repeat the pick-up process and to produce a system malfunction signal if the label 13 is not picked-up after a certain number of attempts, etc. When the label 13 is picked-up from the pick-up point 34, the conveyor sensor means 95 produces a signal which may be used to start the label printer 17 and electric motor 41 so that a subsequent label 13 can be printed and conveyed to the pick-up point 34 while the first label 13 is being applied to the article 15 to thereby provide a faster cycle time, etc. The pad sensor means 97 may include typical photo eye means including Omron E32-DC200 fiber optic cables and an Omron E3XR-CE4T sensor power supply for producing a signal when the first and second mounting plates 73, 85 move to the second, compressed position (i.e., when the pad member 63 presses a label 13 against an article 15). The signal produced by the pad sensor means 97 may be used by the control means 93 to stop the vacuum source 77 and to cause the transfer mechanism to move the label grip means 61 back to the first or home position. The sensitivity of the pad sensor means 97 is preferably adjustable to allow for a wide range of sensitivity settings. The sensitivity adjustment can be set to apply labels 13 to a very light or fragile article 15 without causing damage to the article 15. Additional sensors may be associated with the control means 93 for indicating the presence of an article 15, etc., as will now be apparent to those skilled in the art.

Although the present invention has been described and illustrated with respect to a preferred embodiment and a preferred use therefor, it is not to be so limited since modifications and changes can be made therein which are within the full intended scope of the invention.

We claim:

1. An apparatus for transferring a label with adhesive and printed sides from a label printer to each of a plurality of articles being conveyed, comprising:

a) a printer for printing a plurality of pressure sensitive adhesive labels, each label having an adhesive side and a side for printed matter to be applied thereto by the printer, each of the labels having a release liner backing on the adhesive side, the printer having means for stripping the backing from the labels as they are printed;

b) an output port on the printer for discharging labels in sequence as each label has been printed, and after its backing has been stripped;

c) a label transfer mechanism for transferring labels from the output port to a pick-up point on the transfer mechanism, the transfer mechanism having a transfer surface for moving labels thereon, the surface having means for holding the adhesive side of the label during said transfer so that the printed side can be engaged by a label pick-up pad;

d) label discharge means for helping remove the label from the transfer surface at the pick-up point;

e) pick-up means for lifting a label free from contact with the pick-up point, comprising a moving pick-up pad member having a label holding pad with a plurality of openings over the surface of the pad, wherein the pad surface is freely movable between the pick-up point and the article when the pad is holding the label;

f) vacuum means for applying a vacuum to the pad surface via the openings at a timed sequence when the pick-up means is positioned to receive a label from the label discharge means;

g) sensor means comprising in part an electric eye for producing a signal when a label reaches the pick-up point;

h) control means for using the signal produced by the sensor means to coordinate timing of the label printer, transfer mechanism, the label discharge means, the pick-up means, and the vacuum source so that a label will be grabbed and picked up by the pick-up means and pressed on to an article being conveyed on the conveyor after the article engages the electric eye.

2. The apparatus of claim 1 wherein the sensor means comprises in part an electric eye that can detect the presence of an article to be labeled.

3. The apparatus of claim 2 wherein the sensor means comprises in part a fiber optic cable.

4. The apparatus of claim 1 wherein the conveyor is a conveyor belt.

5. The apparatus of claim 2 wherein the belt is plastic.

6. The apparatus of claim 1 wherein the printer has means for stripping the release liner from the label prior to a discharge of the label from the printer.

7. The apparatus of claim 1 wherein the label applicator is movable between the pick up position and the labeling position.

8. The apparatus of claim 1 wherein the timing means simultaneously activates the air jets and the vacuum source.

9. The apparatus of claim 1 wherein the label applicator comprises in part a pair of plates that move between extended and retracted positions.

10. The apparatus of claim 1 wherein the label applicator has a resilient pad surface with an array of openings on its pad surface and the vacuum source communicates with the array of openings.

11. The apparatus of claim 1 wherein the control means includes sensors for determining when a printed label is at the pick up point on the conveyor means.

12. The apparatus of claim 1 wherein the control means includes sensors that return the label applicator to the pick up point when the printed label is at the pick up point on the conveyor means.

13. The apparatus of claim 1 wherein the control means includes sensors that signal for the label applicator to move to the package and press the label against the package when the package reaches a preselected position.

14. The apparatus of claim 1 wherein the control means includes sensors that determine when the label has been pressed against the article by the label applicator, and responsive thereto, move the label applicator away from the article.

15. The apparatus of claim 1 wherein the label pickup means comprises in part air jet means for directing one or more jets of air at the adhesive side of the label and in a direction that forces the label away from the transfer surface.

16. A method of applying a printed label to each article in a stream of conveyed articles comprising the steps of:

a) generating a plurality of labels with a label printer, each label having an adhesive face;

b) printing printed matter on a face of each of the labels opposite the adhesive face;

c) discharging the labels in sequence from an output port of the printer after printing the label with the printer;

d) placing each label that is discharged from the output port on a transfer surface adjacent the output port that defines a pickup point;

e) moving the label from the output port to the pick up point wherein the adhesive side of the label engages the transfer surface and the printed side of the label faces away from the transfer surface;

f) picking up the label from the pick up point with a moving label applicator that moves from a position spaced away form the pick up point to a position adjacent the pick up point and wherein the label applicator has a pick up pad with a pick up surface that is generally sized and shaped to conform the size and shape of the label and that engages the printed side of the label;

g) using a source of vacuum within the label applicator to hold the printed side of the label to the label applicator;

h) moving the label applicator and the label picked up to a position adjacent an article travelling on a moving conveyor;

i) contacting the article with the adhesive side of the label and the label applicator by engaging the article with the pick up surface of the pad and the attached label;

j) returning the pick up surface of the label applicator to the pick up position when the next label is transferred from the printer output port to the pick up position.

17. The method of claim 16 wherein each label has a release liner covering the adhesive face and in step "c" the release liner is stripped away before the label is discharged from the output port.

18. The method of claim 16 wherein in step "d" the conveyor comprises a conveyor belt.

19. The method of claim 16 further comprising the step between steps "e" and "f" of directing one or more jets of air to the adhesive side of the label.

20. The method of claim 16 wherein in step "h" the article is moving on a conveyor belt.

21. The method of claim 16 wherein in step "d" the conveyor is of a plastic material.

22. The apparatus of claim 9 wherein the pair of plates are generally parallel.

23. The apparatus of claim 22 wherein the plates are each rectangular.

24. The apparatus of claim 22 further comprising spring means positioned between the plates for biasing the plates to the extended position.

25. The apparatus of claim 9 further comprising sensor means for sensing when the plates have moved together toward the retracted position.

26. The apparatus of claim 25 wherein the sensor means defines a switch for returning the pickup pad to the label pickup point.

27. The method of claim 16 wherein the step "f" comprises picking up the label from the pick up point with a moving label applicator that moves from a position spaced away form the pick up point to a position adjacent the pick up point and wherein the label applicator has a pick up pad with a pick up surface that is generally sized and shaped to conform the size and shape of the label and that engages the printed side of the label, the pickup pad including a pair of plates that are movable between extended and contracted positions.

28. The method of claim 27 further comprising the steps of:

forcing the two plates toward the retracted position when a label is applied to an article;

sensing a movement of the plates toward each other with a sensor; and using the sensor to initiate a return of the label holding pad to the label pickup point.

29. The method of claim 28 further comprising the step of using a spring means to bias the plates to the extended position.

* * * * *